G. T. HASTINGS.
COMPOUND TOOL.
APPLICATION FILED APR. 10, 1909.
933,442.
Patented Sept. 7, 1909.
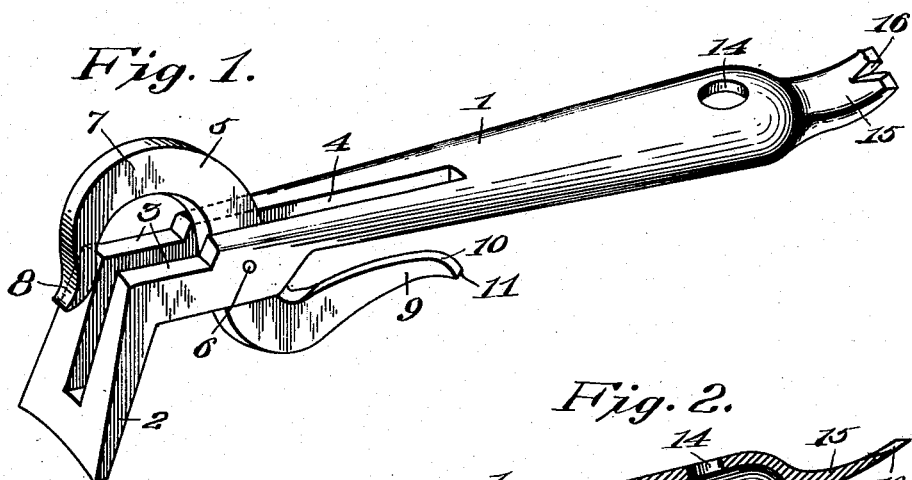
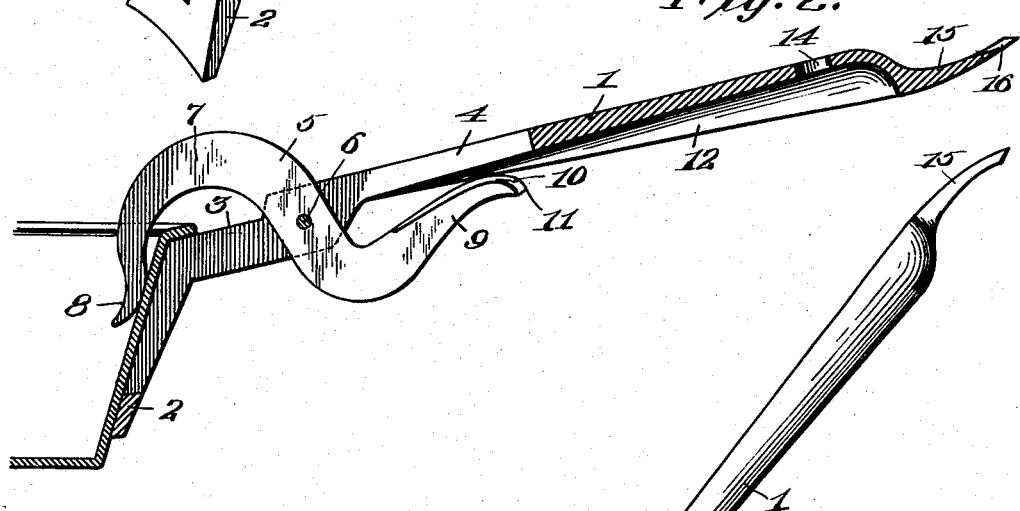
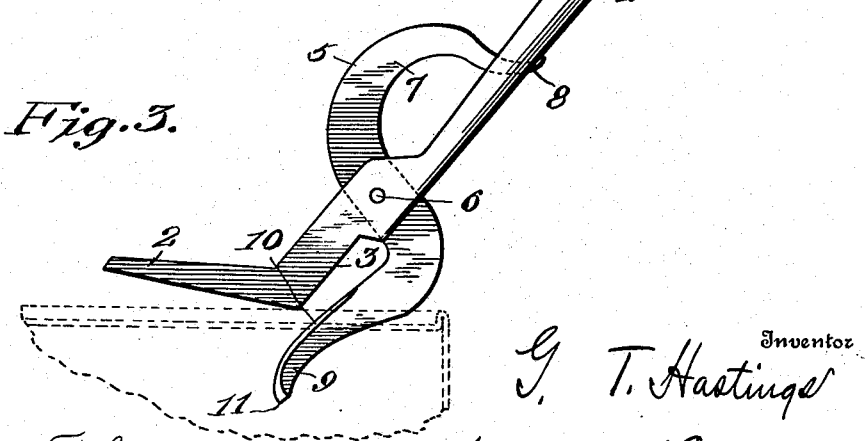
Witnesses
James F. Crown
E. M. Ricketts
Inventor
G. T. Hastings
By Watson E. Coleman
Attorney

UNITED STATES PATENT OFFICE.

GUY T. HASTINGS, OF ASHTABULA, OHIO.

COMPOUND TOOL.

933,442.

Specification of Letters Patent.  Patented Sept. 7, 1909.

Application filed April 10, 1909.  Serial No. 489,110.

*To all whom it may concern:*

Be it known that I, GUY T. HASTINGS, a citizen of the United States, residing at Ashtabula, in the county of Ashtabula and State of Ohio, have invented certain new and useful Improvements in Compound Tools, of which the following is a specification, reference being had to the accompanying drawings.

This invention relates to improvements in compound tools and more particularly to a combined lifter for pots and pans and a can opening device.

The object of the invention is to provide a simple and practical tool which may be effectively used either as a pan lifter or a can opener and which may also be used as a stove lid lifter and tack puller.

With the above and other objects in view, the invention consists of the novel features of construction and the combination and arrangement of parts hereinafter fully described and claimed, and illustrated in the accompanying drawings, in which—

Figure 1 is a perspective view of my improved compound tool; Fig. 2 is a longitudinal section through the same showing its use as a pan lifter; and Fig. 3 is a view showing its use as a can opener.

The invention comprises a hand lever 1 having at its outer end an angularly disposed portion 2 adapted to form a stationary jaw. The outer face of the jaw 2 is preferably concaved in a transverse direction and its lower end is of greater width than its upper end, whereby it may be effectively engaged with the outer face of the rim of a pan, pot or the like, the bead or flange upon said rim being adapted to rest in a recess 3 formed in the outer end of the handle above the jaw 2, as clearly shown in Fig. 2 of the drawings. The jaw 2 and outer end of the handle 1 are slotted longitudinally, as shown at 4, for the reception of a movable jaw 5 in the form of a lever which is pivoted intermediate its ends on a transverse pivot 6 passed through it and the lever at a point adjacent to the outer end of the latter. Said jaw lever 5 has one end substantially U-shaped, as shown at 7, and provided with an outwardly curved extremity 8, whereby it may swing over the upper edge of the pan and effectively engage the inner face of the rim of the same to clamp it against the stationary jaw 2, as clearly shown in Fig. 2 of the drawings. The other end 9 of the jaw lever 5 is curved and tapered longitudinally and has one of its edges beveled to form a cutting edge 10 which terminates in a pointed extremity 11. When the jaw lever is in the position shown in Fig. 2 the pan engaging end 7 is disposed above the stationary jaw 2 so that it may be readily dropped into engagement with the rim of a pan, as shown, and the end 9 of the lever 5 projects downwardly and rearwardly beneath the handle 1 and serves as a finger piece, whereby the lever 5 may be readily manipulated. When the lever 5 is reversed in the slot 3 and the handle 1 is inverted the device is adapted for use as a can opener, as shown in Fig. 3. Upon referring to this figure, it will be seen that the angular end or portion 2 of the lever will serve as a fulcrum for rocking engagement with the top of a can while the end 9 of the lever 5 serves as a cutting blade and the curved extremity 8 of the portion 7 of said lever 5 serves as a finger piece, whereby the lever 5 may be held in the position shown in Fig. 3. The pointed extremity 11 of the blade end 9 of the lever 5 permits said blade to be readily forced through the top of a can and the longitudinal curvature of the cutting edge 10 enables the device to be effectively used in opening a can.

While the handle 1 may be of any suitable form and construction, it is preferably made larger at its inner end and also curved transversely on one side to provide a suitable hand grip. The opposite side of said hand lever is preferably concaved, as shown at 12, to reduce its weight. In said inner end or hand grip of the hand lever 1 is preferably formed an opening 14 whereby it may be engaged with a nail or hook to suspend it when not in use and said end of the hand lever is preferably formed with a reduced longitudinally curved and beveled projection 15 adapted to engage an opening or recess in a stove lid to permit the latter to be lifted by the tool. If desired, said end 15 of the hand lever may be notched or forked, as shown at 16, to provide a claw of the form usually used for extracting nails, tacks and the like.

Having thus described the invention what is claimed is:

A combined pan lifter and can opener comprising a handle having an angular end formed with a longitudinal slot, a lever having one end shaped to provide a jaw and its other end shaped to provide a cutting edge and means for mounting the lever in the slot of the handle so that its respective ends coöperate with the opposite sides of the angular end of the handle.

In testimony whereof I hereunto affix my signature in the presence of two witnesses.

GUY T. HASTINGS.

Witnesses:
A. J. DETTENHAVER,
F. E. COOK.